3,715,317
SOLVENT EXTRACTION PROCESS FOR PRODUCING LOW-NITRATE AND LARGE-CRYSTAL-SIZE $PuO_2$ SOLS
Milton H. Lloyd and Othar K. Tallent, Oak Ridge, and Rex E. Leuze, Lenoir City, Tenn., assignors to the United States of America as represented by the United States Atomic Energy Commission
No Drawing. Filed June 2, 1971, Ser. No. 149,357
Int. Cl. C01g 56/00
U.S. Cl. 252—301.1 S                     7 Claims

ABSTRACT OF THE DISCLOSURE

Low-nitrate plutonia sols having a $NO_3/Pu$ mole ratio in the range 0.1 to 0.4 with average crystallite diameters of 30 to 80 A. can be produced when a sol is prepared by solvent extraction of a plutonium nitrate seeded with a plutonia sol. When the seeded sol is taken to dryness and heated for 10 to 120 minutes at a temperature in the range 190–230° C., nitrate removal occurs with concomitant crystallite growth.

BACKGROUND OF THE INVENTION

The invention described herein was made in the course of, or under, a contract with the U.S. Atomic Energy Commission.

The present invention relates to plutonia sols. More particularly, it relates to a process for producing stable plutonia sols alone or as a mixed sol such as a plutonia-urania sol. Sols of the kind referred to in this invention are eminently useful as feed for the production of actinide oxide dense microspheres.

In the context of sol-gel technology for the production of oxide microspheres, a stable sol is one which has a useful shelf life and which is long enough to enable the sol to be processed to a microsphere. A sol with a useful shelf life means one which maintains a sol condition without settling out of the solid phase such as by precipitation or by gelling or which does not undergo any chemical change. Shelf life is important for production logistics, since it is generally desirable to maintain an inventory of sol available for processing into microspheres. To speak of a stable sol in terms of shelf life alone, however, does not necessarily qualify the sol as stable since experience has shown that sols with long shelf life are not necessarily sufficiently operationally stable when they undergo processing to form microspheres, particularly where microsphere production involves mixed sols such as plutonia and urania.

The plutonia sols produced by this invention are derived principally from aqueous solutions of plutonium nitrate by a solvent extraction process known as the Alcohol-Plutonium Nitrate Extraction process and hereinafter referred to as the APEX process. The APEX process requires several steps, the first being extraction of nitric acid with an aqueous immiscible alcohol, such as n-hexanol, to decrease the nitrate-to-plutonium mole ratio to about 2.5. The solution is then digested at elevated temperature, about 100° C., to hydrolyze the plutonium (which is thought to exist, by then in polymeric form), thus releasing more nitric acid. After cooling to room temperature, the solution or sol is further extracted with n-hexanol to produce sol with a nitrate-to-plutonium mole ratio of about 1.0. Alternately, the sol can be prepared by continuous extraction which avoids the digestion step, and this is the preferred method. Additional nitrate can be extracted to provide a final $NO_3/Pu$ mole ratio of 0.6–0.8 in a sol. Such a sol can be concentrated to more than 1 M in plutonium where the desired plutonium concentration is reached by evaporation. This procedure is referred to by us as the regular APEX process. It produces a stable, highly crystalline sol, where stability means a useful shelf life. Regular APEX sols are called high-nitrate sols, where high nitrate means a sol which has a $NO_3/Pu$ mole ratio in the range 0.6 to 1. High-nitrate sols have a limited utility for making $PuO_2$ microspheres because of the deleteriously high nitrate content and high surface area of the solid phase of the sol which result in extensive cracking of calcined microspheres.

APEX sols have been found suitable for making $PuO_2$-$UO_2$ microspheres from mixture of an APEX sol with a $UO_2$ sol. There are, however, some severe shortcomings. Mixed sols of APEX-derived $PuO_2$ and $UO_2$ must be maintained at about 4–5° C. in order to provide adequate shelf life for future processing to microspheres. Moreover, while a high-anion (nitrate) sol is satisfactory for shelf life stability of $PuO_2$ sols, high anion concentrations detract from the stability of mixed $PuO_2$-$UO_2$ sols.

Static stability, as measured by shelf life, as well as operational stability of sols, has been associated with crystallinity as opposed to amorphous or polymeric solid phase of the sol, low nitrate (0.1–0.4) as opposed to high (0.6–1.0), and crystalline size. The crystallite size of urania in urania sols is inherently much larger than plutonia crystallites regardless of the sol preparation method, although these methods do not employ temperatures in excess of ~60° C. The size of urania crystallites can also be additionally increased by digestion of the sol in the temperature range 80–100° C. Plutonia sols in general and APEX sols in particular consist of very small crystallites which show no detectable change in crystalline size when treated by any known method at temperatures below 150° C. While it is possible to reduce the $NO_3/Pu$ mole ratio of APEX sols by exhaustive extraction of concentrated sols at low temperature, there is no detectable crystallite growth, and the nitrate loss is accompanied by random aggregation of crystallites which is generally undesirable. Results from thermal denitration of sols prepared by a precipitation process show that high-nitrate sols require extensive baking periods at high denitration temperatures before an acceptably low $NO_3/Pu$ ratio is reached; and, while higher denitration temperatures will reduce the baking time necessary to reach a low-nitrate sol (i.e., with a $NO_3/Pu$ mole ratio of less than 0.2), very uniform heating is required. If overheating occurs, it is frequently impossible to redisperse the baked product back to sol form.

While high-nitrate plutonia sols prepared by solvent extraction procedures can be processed to gel microspheres, it has not been possible to obtain dense calcined microspheres with satisfactory yields. The principal problems involve particle malformation during the sphere-forming process, and a pronounced tendency for the particles to crack and disintegrate during forming, drying, and calcining. The "high" nitrate content and high surface area of these plutonia sols also limit the ability to mix them with thoria sols since unstable mixtures frequently result. These problems associated with high-nitrate sols have been interpreted as resulting from high surface area and the high nitrate content which contribute to the physical and chemical instability of mixed sols and to the malformation experienced during the sphere formation process. Experienced investigators in this technology have long sought for a plutonia sol which is a low-nitrate sol and which contains large crystals of plutonia of the order of 50 A. or more as opposed to a crystal size of 10–20 A. on the reasoning that the larger crystals associate less nitrate due to the much lower surface area of the plutonia.

SUMMARY OF THE INVENTION

With this background in mind, it is the principal object of this invention to provide a plutonia sol which has a useful shelf life and which can be subsequently processed to dense microspheroidal particles.

It is another object of this invention to provide a low-nitrate plutonia sol which has a large crystallite size.

It is still another object of this invention to provide a plutonia sol which is both statically and operationally stable.

It is a further object of this invention to provide a method for realizing the aforementioned objects.

In its process aspect, the present invention may be regarded as an improvement in the APEX process involving two essential steps in which (1) a portion of a previously prepared APEX sol is added as a "seed" to a feed solution of plutonium nitrate as it undergoes nitrate extraction to form a sol and where (2) the resultant seeded sol can be converted by a baking operation to a low-nitrate plutonia sol with large crystallite size.

We have discovered that, when a plutonium nitrate solution is seeded with a plutonia sol as the solution undergoes nitrate extraction, a distinctive ordered aggregation of particles, micelles, occurs which have been found, by electron microscopy techniques, to be as large as 150–200 A. and are statically stable. Moreover, this aggregated micelle structure is not affected by sol aging at ambient temperature, by extensive nitrate extraction, or by boiling at 100° C. That is to say, we find that the "seeded" sol retains the sol form, but does not undergo crystallite growth. More specifically, "seeded" sols at this stage do not appear to afford any significant process advantage over regular APEX sols since both sols have comparable high $NO_3/Pu$ mole ratios (0.6 to 0.8), and mixed $UO_2$-$PuO_2$ sol stability is not improved by forming the aggregated micelle structure only. In other words, mixed sols of $PuO_2$ and $UO_2$ derived from solvent extraction processes still need to be cooled to 4° C. to effect static as well as operational stability. We have discovered, however, that the seeded sol with its aggregated micelle structure can be effectively denitrated to a low-nitrate sol and undergo crystallite growth when taken to dryness and heated. Specifically, low-nitrate sols ($NO_3/Pu$ 0.1–0.4) with average crystallite diameters (as measured by X-ray line broadening or electron micrograph techniques) in the range 30–80 A. can be prepared when a sol, with the appropriate aggregated micelle structure induced by seeding, is taken to dryness and heated for 10 to 120 minutes at temperatures in the range 190–230° C. When the seeded APEX sol is baked under thermal denitration conditions, we obtain a baked product which upon redispersion with water produces a low-nitrate sol which has crystallites in the range 30 to as high as 100 microns. This is in direct contrast to the behavior of regular APEX sols which show no detectable change in crystallite size or any significant reduction in the $NO_3/Pu$ mole ratio when heated to these temperatures for much longer times.

To form the product sol which is to serve as feed for microsphere formation, the baked product is mixed with water to effect redispersion of the solids into colloid form.

The seeding effect

Several variations in the seeding technique can be used to obtain the desired aggregated micelle structure. In the broad sense, the development of the desired micelle structure can be effected by introducing a plutonia sol during solvent extraction of a feed plutonium nitrate soluton. Alternatively, and for reasons of consistency and reproducibility, we prefer to use a parent seed sol which was itself prepared by a seeding technique. This we call double seeding.

We can achieve a maximum micelle-forming effect by multiple seeding by which we mean incremental addition of the feed nitrate solution during continuous extraction in a single run. A multiple-seeding effect is obtained because extraction is continued after each feed addition until plutonium polymerization occurs—and hence a sol is formed before the next addition of feed. Single-seeding experiments have been found to produce a sol in which an average micelle size of 50–75 A. converts to an average crystallite size of 35–40 A. in diameter. By the multiple-seeding effect we have obtained average crystallite sizes in the range 30 to a maximum of 100 A. after baking the seeded sol and redispersion of the baked seeded sol.

The presence of the desired aggregated micelle structure can be detected by electron micrography and electron diffraction. In studies of non-seeded as well as seeded sols, we have established the necessity of seeding as the means for producing micelle structure in plutonia sols; and, by studying sols produced by redispersion of dried and baked sols, seeded or unseeded, we have established the relationship between seeded sols as the requisite source for low-nitrate and large-crystallite plutonia sols.

The amount of seed determines the existence and amount of micelle structure. A minimum of 20 percent of the total plutonium (seed+feed) for single seeding and 25–30 percent for double seeding is required for effective development of the aggregated micelle structure. The $NO_3/Pu$ mole ratio of the seed can be varied over fairly wide limits from 0.7 to 1.2. The age of the seed appears significant, provided only that it remains as sol and is not gelled. The seed polymer can be added to the feed (plutonium nitrate) solution prior to or during extraction, provided the conductivity of the feed is no less than about 70 millimhos/cm. Poor results in terms of incomplete aggregation are obtained when seed is added to a feed having lower conductivity.

The concentration of plutonium in the aqueous feed solution can be varied over wide limits, from 15 up to 30 g. Pu/l. of solution. However, at a plutonium concentration over 30 g./l., excessive plutonium extraction will occur using present techniques and the nitric acid concentration may range from 0.5 to 1.0 M. A concentration of 26 to 28 g. Pu/l.; 0.6 M $HNO_3$ provides feed with an initial conductivity of about 100 millimhos/cm.

Seeding (single, double, or multiple) may begin immediately upon APEX-type extraction of such solutions and continued until a $NO_3/Pu$ mole ratio in the range 0.7 to 0.9 is attained. Higher values appear to decrease the thermal denitration rate and lower values result in plutonia sols which will not resuspend after baking. APEX and similar solvent extraction processes are capable of reducing the $NO_3/Pu$ to a minimum of ~0.6 even with a digestion step to produce a sol with good shelf-life stability. Further reductions in nitrate content by solvent extraction cause gelling or precipitation.

The aggregated micelle structure resulting from seeding promotes rapid denitration during baking. For example, a sol containing the desired aggregated micelle structure prepared by double seeding will denitrate to a $NO_3/Pu$ mole ratio of about 0.15–0.17 in 10 minutes at a baking temperature of 230° C. and will denitrate additionally to a value as low as 0.1 without adversely affecting the final sol in 30–40 minutes. For sols of this type, the micelles convert to an average crystallite size of about 60 A., and conversion to the larger crystallites appears to be essentially complete after 10–15 minutes of baking time. By comparison, an unseeded APEX sol with the same initial $NO_3/Pu$ ratio will still be 0.4 after 4 hours of baking at 230° C.

A distinctively advantageous feature of this invention is that the dried sols are quite insensitive to overheating. The dried sols can be baked for extended periods even after reaching a prescribed $NO_3/Pu$ condition without adversely affecting the characteristics of the sol formed by redispersion. On the other hand, unseeded plutonia sols (which do not have the aggregated micellular structure) produced from solvent extraction or precipitation processes are exceedingly sensitive to baking time, leading to unpredictable final $NO_3/Pu$ ratio and even to baked products which will not resuspend to sol.

In order to reach a desired low-nitrate plutonia sol with large crystallite size, we employed a baking temperature in the range 180–240° C. and preferably in the range 200–230° C. to produce a baked product which is easily redispersable to the final stable product sol. In a typical cycle, the APEX sol or other sol derived from solvent extraction is evaporated to dryness in air, rapidly heated to the desired baking temperature, and then held at the selected baking temperature for a period of 10 to 60 minutes. The baked product is allowed to cool to room temperature and then redispersed to form the desired sol.

Having described the invention in general terms, we now provide specific embodiments which illustrate in specific examples how the invention may be practiced to produce plutonia and mixed plutonia-urania sols of enhanced stability.

EXAMPLE I

Preparation of the seed sol

To prepare seed material, 500 ml. of plutonium nitrate feed solution (Pu=26 to 28 g./l. $HNO_3$=0.6–0.8 M) was contacted with about 3 liters of n-hexanol in the APEX extraction equipment. The initial conductivity of the feed solution was 100 millimhos/cm. The feed solution was extracted continuously at 25° C. until the conductivity was reduced to 6 millimhos/cm. which corresponds to a $NO_3/Pu$ mole ratio of 0.8±0.1. The sol was removed from the extraction equipment and concentrated by evaporation to 150–200 ml. This concentration step is made only to provide a convenient volume for subsequent handling and does not affect the sol's properties.

EXAMPLE II

Preparation of single-seed sol

Five hundred ml. of plutonium nitrate feed (Pu=26–28 g./l.; $HNO_2$=0.6–0.8 M) was charged to the extraction equipment and contacted with 3 liters of n-hexanol at 25° C. until the conductivity of the feed solution was reduced to 80 millimhos/cm. corresponding to a $NO_3/Pu$ ratio of ~7.0. Forty-four ml. of the seed sol was added (Pu=74.9 mg./ml.) to the feed without interrupting extraction. This provides a plutonium seed concentration which is 20 percent of the total plutonium in the system. The extraction was continued at 25° C. until the conductivity of the sol was 6 millimhos/cm. corresponding to a $NO_3/Pu$ mole ratio of 0.8±0.1. The sol was removed from the extraction vessel and concentrated to a convenient volume (~150 ml.) by evaporation.

EXAMPLE III

Preparation of double-seed sol

Five hundred ml. of plutonium nitrate feed solution (Pu=26–28 g./l.; $HNO_3$=0.6–0.8 M) was charged to the extraction equipment and contacted with 3 liters of n-hexanol at 25° C. until the conductivity of the feed solution was reduced to 80 millimhos/cm. Seventy-nine ml. of "single-seed" sol (Pu=72.5 mg./ml.) was added to the feed solution. This provides a plutonium seed concentration which is 30 percent of the total plutonium in the system. The extraction was continued until the conductivity of the sol was 6 millimhos/cm. ($NO_3/Pu$ mole ratio=0.8±0.1). The sol was then evaporated to dryness and baked. The sol was taken to dryness at 80–90° C. and the temperature was not allowed to exceed 100° C. The dry mass was then charged to a baking apparatus consisting of a stainless steel pan in an aluminum block containing a heating element. The baking apparatus was preheated to 230° C. before the solids were added. During baking, a lid was placed over the pan and air was pulled through the baker to remove gaseous decomposition products. Baking times of 15, 40, and 75 minutes at temperature resulted in $NO_3/Pu$ mole ratios of 0.16, 0.13, and 0.10, respectively, where the $NO_3/Pu$ concentrations were measured in the sol resulting from dispersion of the baked mass. The sol can be heated for at least an additional 60 minutes without reducing the $NO_3/Pu$ mole ratio or otherwise noticeably affecting the sol's characteristics. The solids are then removed from the baking apparatus and suspended in water. Excess water can be used if desired and the sol can be concentrated to greater than one molar by evaporation.

EXAMPLE IV

Single-run/multiple-seeding sol preparation

Fifty ml. of "seed" sol (116 mg. Pu/ml.) was mixed with 50 ml. of plutonium nitrate feed (Pu=21.5 mg./ml.; $HNO_3$=0.6 M) and extracted with 3 liters of n-hexanol at 25° C. until the conductivity was reduced to 21.6 millimhos/cm. One hundred ml. of feed was added which increased the conductivity to 90 millimhos/cm. and extraction was continued until the conductivity was reduced to 22.5 millimhos/cm. One-hundred-fifty ml. of feed was added and extraction was continued until the conductivity was 25.5 millimhos/cm. Two hundred ml. of feed was added and extraction was continued until a final conductivity of 6 millimhos/cm. was obtained. The extraction was continuous, and the total extraction time was about 30 percent less than that required in the experiments described above. The sol was then removed from the extraction equipment, evaporated to dryness, and baked as previously described. The final sol was essentially identical to sol obtained by "double" seeding.

The sols formed in accordance with the preceding examples produce a low-nitrate sol derived from the baking procedure with enhanced stability and larger crystallite sizes than have been possible by other methods of which we are aware. The effect of drying temperature on seeded as well as unseeded sols is shown in the following table.

TABLE.—COMPARISON OF PLUTONIA SOLS PREPARED BY SEVERAL MODIFICATIONS OF THE APEX PROCESS

| Sol preparation | Approximate drying (° C.) | $NO_3/Pu$ mole ratio of unmixed $PuO_2$ sol | Approximate average crystalline size of $PuO_2$ in $PuO_2$ sol (A.) | Mixed $UO_2$-$PuO_2$ sol shelf life at 25° C. |
| --- | --- | --- | --- | --- |
| Regular APEX | (1) | 0.71 | 10–20 | 30 min. |
| Do | 200 | 0.63 | 10–20 | 1 hr. 45 min. |
| Do | 230 | 0.68 | 10–20 | 1 hr. 45 min. |
| Continuous extraction APEX [2] | (1) | 0.67 | 10–20 | 1 hr. 50 min. |
| Do [2] | 200 | 0.68 | 10–20 | 10 hr. |
| Single seeding continuous extraction | 180 | 0.53 | (3) | 20 hr. |
| Do | 230 | 0.39 | 30–40 | 132 hr. (5½ days). |
| Double seeding continuous extraction | (1) | 0.64 | 10–20 | 1 hr. |
| Do | 160 | 0.63 | (4) | 2 hr. 30 min. |
| Do | 180 | 0.50 | (4) | 10 hr. |
| Do | 200 | 0.41 | (4) | 48 hr. |
| Do | 220 | 0.20 | 55–65 | 138 hr. |
| Multiple feed addition | 230 | 0.19 | 55–75 | 192 hr. (8 days). |

[1] Not dried.
[2] Denotes continuous extraction of plutonium nitrate solution with n-hexanol down to a $NO_3/Pu$ mole ratio of ~1.0 without digestion at 100° C.
[3] Consists generally of both aggregates of small crystallites (10–20 A.) and 30–40 A. crystallites which resulted from conversion of aggregates.
[4] Consists of both aggregates of small (10–20 A.) and 55–75 A. crystallites.

As seen from the table, drying temperatures in the range 160–230° C. were used. When sols were dried at the higher temperatures, they were evaporated to dryness slowly at temperatures below 100° C. The dry solids were then rapidly heated to the desired temperature, held at this temperature for 30 minutes, removed from the heat, and allowed to cool. Sols which were not dried were concentrated to ~1 M $PuO_2$ by evaporation and extracted three times with n-hexanol. Ten volumes of n-hexanol were contacted with one volume of sol during each extraction. This procedure was expected to remove all of the extractable $HNO_3$. Mixed sol stability tests were made by mixing sufficient $PuO_2$ sol with CUSP-prepared $UO_2$ sol (which had been freshly contacted with an equal volume of water-saturated n-hexanol) to provide a total metal concentration of 0.95 M (80% $UO_2$, 20% $PuO_2$), and the sols were aged at 25° C. until gelation occurred.

Electron micrographs and electron diffraction patterns were obtained for all of the sols shown. There was no apparent change in crystallite size or crystallinity for the unseeded sols when they were dried at 200–230° C. The $NO_3$/Pu mole ratios for unseeded sols were not affected by this heating step, indicating that there was no appreciable change in crystallite size. Seeded sols showed a regular decrease in $NO_3$/Pu mole ratio with increasing drying temperature, with corresponding increases in average crystallite size. This increase in size was apparent from both electron micrographs and electron diffraction patterns of the dried sol. The micrographs indicated that the increase in average crystallite size with increasing drying temperature does not result from gradual growth of small crystallites, but from an increasing number of micelle aggregates which have converted to larger crystallites. For example, in the double-seeding runs shown, a micrograph of the undried soil indicated that very small crystallites (100–20 A.) are primarily aggregated to form micelles which vary in diameter from <50 A. to ~180 A. Micrographs at the intermediate drying temperatures (160°, 180°, and 200° C.) also showed micelle aggregates present. However, a change in the electron diffraction patterns for material heated at 180° C. and 200° C. indicated that large crystallites are also present, correlating with the decrease in $NO_3$/Pu mole ratios shown in the table. At 220° C., a rather dramatic change in the appearance of the micrograph occurred because the micelles had been completely converted to larger crystallites. This complete conversion was also indicated by the electron diffraction pattern and the $NO_3$/Pu mole ratio.

These changes in sol characteristics are also reflected by the improvements in mixed $UO_2$-$PuO_2$ sol shelf life at 25° C., as shown in the right-hand column of the table. The data reflect that a substantial increase in shelf life is obtained even before complete conversion of the micelles to crystallites occur; that is, with sols baked in the 180–200° C. range.

One very important feature of obtaining relatively large crystallites by the seeding-and-baking technique is that the dried sols appear to be quite insensitive to overheating. We have found, for example, that seeded sols could be heated much longer than necessary for optimum crystallite formation without adversely affecting final sol characteristics.

In summary, we have shown that low-nitrate sols can be prepared ($NO_3$Pu=0.1–0.2) with average crystallite diameters of ~60 A. when a seeded sol with the appropriate aggregate structure is taken to dryness and heated for 10 to 60 minutes at a temperature in the preferred range of 200–230° C. While lower temperatures may be used down to 190° C., the denitration times become excessively long. This is in direct contrast to the behavior of unseeded APEX sols, which show no detectable change in crystallite size or any significant reduction in the $NO_3$/Pu mole ratio when heated at these temperatures for much longer times. The specially prepared sols with low nitrate-to-plutonium mole ratios and with larger crystallites exhibit greatly improved mixed-sol shelf life. For example, the time to gelation for 0.9–1.0 M sol (80% $UO_2$–20% $PuO_2$) at 25° C. is increased from <1 hour for regular APEX sol to 5–8 days for the modified (seeded, baked, and redispersed) products. We have also formed pure plutonia microspheres which calcine to dense, crack-free products. This has not been possible with high-nitrate plutonia sols to a successful degree, including regular APEX sols, because of extensive cracking and disintegration of the spheres during calcination. Excellent results were also obtained in small-scale experiments when these larger crystallite sols were mixed with CUSP sols and formed into microspheres. Standard CUSP-APEX forming conditions were used in these experiments except that it was not necessary to cool the mixed sols so they were handled entirely at room temperature.

EXAMPLE V

Preparation of mixed 80% $UO_2$–20% $PuO_2$ microspheres

Twenty ml. of CUSP urania sol (U=238 g./l., $NO_3$/U=0.11, HCOO/U=0.45)

was contacted with 20 ml. of water-saturated n-hexanol. The sol was separated from the alcohol phase and mixed with 5.3 ml. of low-nitrate APEX sol (Pu=225 g./l., $NO_3$/Pu=0.19) at room temperature (~25° C.) Twelve ml. of the mixed sol was fed to a microsphere-forming column after the sols were mixed and the remainder of the sol was formed into spheres 4 hours later to stimulate long-term operations. The drying medium in the column was 2-ethyl-1-hexanol which contained 0.15 vol. percent Span–80 (a surface-active agent comprising sorbitan monooleate) and 0.40 vol. percent Pluronic L–92 (a nonionic surfactant obtainable from Wyandotte Chemical Corporation, Wyandotte, Mich.). The set gel spheres were removed from the column and dried in an argon gas stream at room temperature. The spheres were then heated slowly (50–100° C.—rise per hour) to 1150° C. in a 4% $H_2$-Ar atmosphere and allowed to cool. The two batches were dried and calcined separately. Dense, crack-free microspheres 400–600μ in diameter were obtained in both cases and product yields were 95% for both batches.

A CUSP sol refers to the method of forming urania sols as described in U.S. patent application Ser. No. 814,311 of common assignee, filed Apr. 8, 1969, where a predominantly crystalline urania sol is prepared from an acid-deficient solution of uranous nitrate by heating the solution to a crystallizing temperature of between 58° C. and 65° C. and removing nitrate ions at that point at a rate which approximates the rate of release of free acid to the aqueous phase of the resultant sol. CUSP sols are used by way of example. Other urania sols may also be used to produce $UO_2$-$PuO_2$ mixed sols and microspheres.

What is claimed is:

1. A method of preparing a plutonia sol which comprises mixing a seed plutonia sol with an aqueous solution of plutonium nitrate; extracting nitrate from the resulting mixture until a sol having a conductivity in the range 5 to 7 millimhos corresponding to a $NO_3$/Pu mole ratio in the range .7 to .9 is reached; drying the resulting sol to solid; heating said solid to effect denitration and crystallite growth; and then dispersing the baked product to form a low-nitrate sol having an average crystallite size in the range 30 to 100 angstroms.

2. The method according to claim 1 in which the amount of seed sol is sufficient to produce an aggregated micellular structure resulting from nitrate extraction of said plutonium nitrate solution.

3. The method according to claim 1 in which the seed sol is itself derived from the nitrate extraction of a solution of plutonium nitrate.

4. The method according to claim 1 in which the dried sol is baked at a temperature in the range 190–230° C. for a period of 10 to 120 minutes.

5. A method for converting a plutonium nitrate solution to a sol which comprises contacting a first portion of said solution with an aqueous immiscible organic alcohol or amine to selectively remove nitrate ion to the point where that portion of solution is converted to sol, adding a second portion of said solution to the sol produced from the first portion with continuous nitrate extration until a sol is produced from that second portion, and continuing to add increments of solution to the aqueous phase in contact with nitrate extracting alcohol or amine until the entire solution has been converted to a final sol having a conductivity of no less than about 6 millimhos/cm.

6. The method according to claim 5 in which the final sol is dried and then baked to effect denitration and crystallite growth and then dispersing the baked product to a product sol having a $NO_3/Pu$ mole ratio in the range 0.1 to 0.4 and an average crystallite size in the range 30 to 100 angstroms.

7. A method for preparing a low-nitrate plutonia sol which comprises extracting an aqueous solution of plutonium nitrate with an aqueous miscible alcohol or amine to effect selective extraction of nitrate ions to the point where a plutonia sol occurs, introducing a seed plutonia sol into the aqueous phase before or during the nitrate extraction, drying the sol and then heating the dried sol to a temperature in the range 190–230° C. to effect denitration and crystallite growth, and then dispersing the baked product to produce a low-nitrate sol with an average crystallite size in the range 30 to 100 angstroms.

References Cited

UNITED STATES PATENTS

| | | | |
|---|---|---|---|
| 3,600,323 | 8/1971 | Tallent | 252—301.1 |
| 3,461,076 | 8/1969 | Lloyd et al. | 252—301.1 |
| 3,513,101 | 5/1970 | Meservey | 252—301.1 |
| 3,310,386 | 3/1967 | Lloyd | 23—344 |

CARL D. QUARFORTH, Primary Examiner

R. L. TATE, Assistant Examiner

U.S. Cl. X.R.

423—251